United States Patent [19]
DeVoe

[11] Patent Number: 5,244,095
[45] Date of Patent: Sep. 14, 1993

[54] CAKE DECORATING UTENSIL ORGANIZING CONTAINER

[76] Inventor: Stacey M. DeVoe, Rte. 2, Box 54B, Madisonville, Tex. 77864

[21] Appl. No.: 930,351

[22] Filed: Aug. 17, 1992

[51] Int. Cl.[5] ...................... B65D 21/02; B65D 85/14
[52] U.S. Cl. .................................. 206/575; 34/209; 34/235; 206/229; 206/277; 206/373; 206/553; 220/571; 312/300
[58] Field of Search ............. 34/202, 209, 235; 206/1.7, 223, 229, 277, 373, 549, 550, 553, 581, 575; 220/23.83, 23.86, 367, 410, 503, 505, 676; 312/266, 300, 309, 324, 326, 329, 902

[56] References Cited

U.S. PATENT DOCUMENTS

| | | | |
|---|---|---|---|
| 1,554,818 | 9/1925 | Greenstreet | 312/326 |
| 1,992,630 | 2/1935 | Piperoux | 206/373 |
| 3,350,810 | 11/1967 | Warner et al. | 206/315.11 |
| 4,239,308 | 12/1980 | Bradley | 312/300 |
| 4,729,474 | 3/1988 | Lanius et al. | 206/315.11 |
| 4,765,470 | 8/1988 | Curci | 312/329 |
| 4,895,256 | 1/1990 | Johnston | 220/505 |
| 4,927,025 | 5/1990 | Thompson et al. | 206/223 |
| 4,949,839 | 8/1990 | Ferrero | 206/223 |

OTHER PUBLICATIONS

1992 Baker's Best catalog, Wilton Industries p. 49.
undated advertisement, Sassaby, Ltd., Del Mar, CA Model 101 Swivel Tray Cosmetics Organizer.
1991 pamphlet, Sassaby Ltd. "Win Sassaby's 'Meet the Cast' 90210 Contest", Model 106 Organizer.
undated advertisement, Caboodles of California Model 2410 Gemstone Jewelry Organizer.
undated advertisement, Caboodles of California New Wave Organizer.

*Primary Examiner*—Jimmy G. Foster
*Attorney, Agent, or Firm*—Plews & Shadley

[57] ABSTRACT

A cake decorating utensil organizing container is disclosed for providing a container to store a variety of cake decorating utensils in a secure, organized and readily accessible manner. Clean, wet pastry tips may be stored in an erect position in individual sleeves in outwardly rotatable holders, with moisture from the pastry tips caught on outwardly rotatable drip trays. Evaporation of moisture is facilitated by ventilation holes. Additional cake decorating utensils may be stored in a removable utensil tray and also in a base portion. The container may be rapidly disassembled into component parts for cleaning.

18 Claims, 14 Drawing Sheets

CAKE DECORATING UTENSIL ORGANIZING CONTAINER

BACKGROUND OF THE INVENTION

1. Field of the Invention

The process of cake decorating involves the use of a number of specialized utensils, and in a commercial environment there is a need to have a large number of such utensils clean, dry and ready for rapid and efficient use at all times. The present invention generally relates to containers for cake decorating utensils, and more particularly concerns cake decorating utensil containers which are capable of storing cake decorating utensils in an organized manner and which may be easily disassembled in order to permit thorough cleaning.

2. Description of the Prior Art

The array of utensils which may be used in decorating a cake is wide, and includes pastry tips, couplers, coupler rings, pastry bags and cones, spatulas, paste colors, cake impressions and other utensils. In addition, the need to have a large number of pastry tips clean, dry and readily accessible is a major feature to be considered in cake decorating utensil containers. Pastry tips are physically small and are tedious to wash due to the greasy nature of frosting. Subsequent to washing, the metal pastry tips must be dried without delay, in order to prevent rusting.

A number of cake decorating utensil containers are presently available, for instance, the Tool Caddy number 2104-Y-2237, the containers of the Deluxe Tip Set number 2104-Y-6666, and the Master Tip Set number 2104-Y-7778 shown in the Baker's Best catalog of the Wilton Bakery Division of Wilton Industries.

Cake decorating utensil containers may have a plurality of recessed compartments for the storage of pastry tips in a horizontal position, with each pastry tip to be contained in a compartment and disposed on its side. Alternatively, cake decorating utensil containers may have a plurality of vertical pegs, with each pastry tip to be disposed over a peg, thereby storing the pastry tips in a vertical position. In either case, the pastry tips must be clean and dry prior to placement in the cake decorating utensil container in order to prevent rusting of the pastry tips.

Despite the availability of such devices, there exists a need in the art for a cake decorating utensil container that is capable of securely and conveniently storing a number of cake decorating utensils, including the storage of a plurality of pastry tips immediately after washing so that the pastry tips may air dry without manual drying, yet also is capable of being easily and completely disassembled for rapid and thorough cleaning.

SUMMARY OF THE INVENTION

In order to aid in the understanding of the present invention, it can be stated in essentially summary form that it is directed to a cake decorating utensil container that is capable of storing a variety of cake decorating utensils in an organized and readily accessible manner yet is capable of being easily disassembled for cleaning.

It is an object of the present invention to provide a cake decorating utensil container that is capable of securely storing a plurality of recently washed pastry tips so that the pastry tips dry without manual drying.

It is another object of the present invention to provide a cake decorating utensil container that is capable of storing a plurality of pastry tips in an erect position so that the pastry tips are easily identified.

It is another object of the present invention to provide a cake decorating utensil container that is capable of rapid and easy disassembly, cleaning and reassembly.

It is another object of the present invention to provide a cake decorating utensil container that organizes and stores cake decorating utensils in an organized and readily accessible manner.

It is another object of the present invention to provide a cake decorating utensil container that may be easily stored and carried.

It is another object of the present invention to provide a cake decorating utensil container that may be constructed entirely of corrosion resistant materials.

It is still another object of the present invention to provide a cake decorating utensil container that is inexpensive to produce.

It is yet another object of the present invention to provide a cake decorating utensil container of relatively simple construction with a minimum of components.

Further objects and advantages of the present invention will be apparent from a study of the following portion of the specification, the claims, and the attached drawings.

DESCRIPTION OF THE PREFERRED EMBODIMENT

Figure 1:
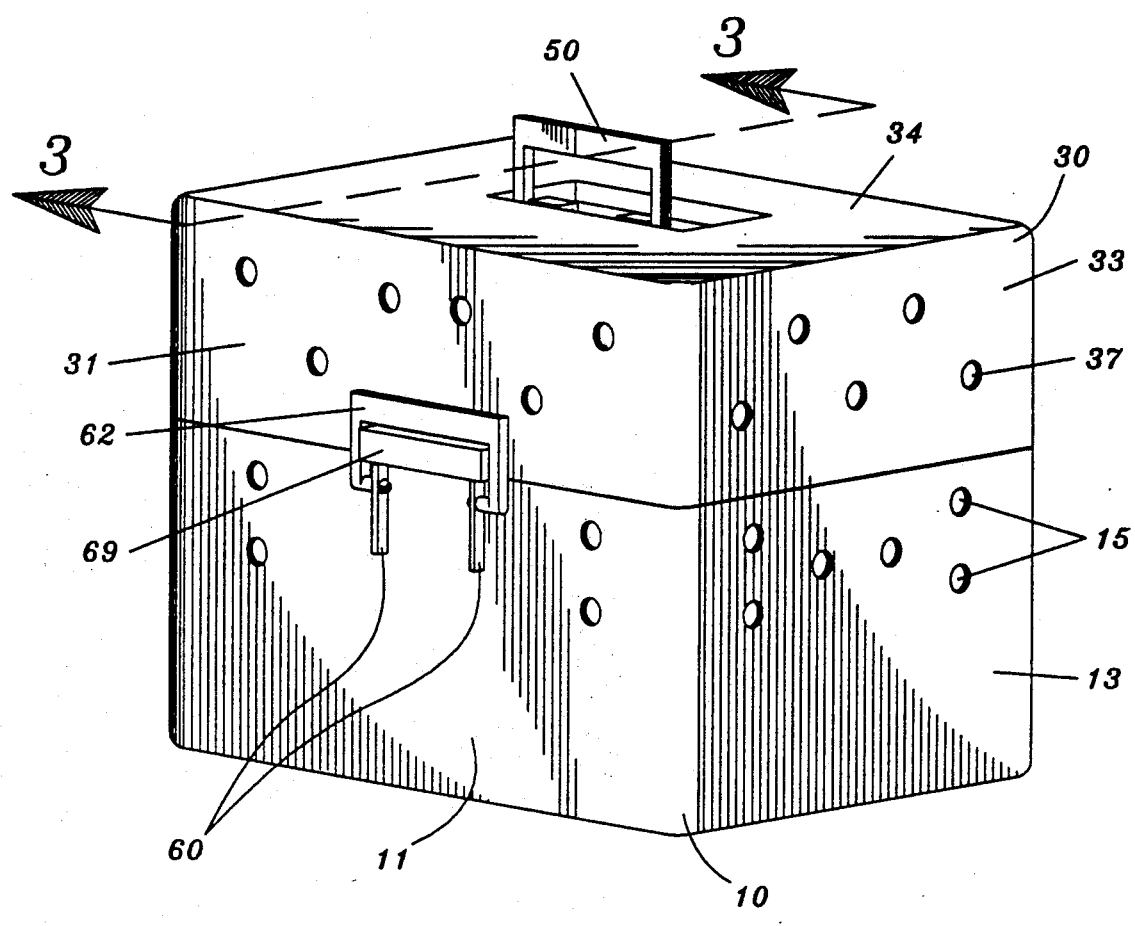
FIG. 1 is a front perspective view of a cake decorating utensil container representing the present invention.

The following portion of the specification, taken in conjunction with the drawings, sets forth the preferred embodiment of the present invention. The embodiment of the invention disclosed herein is the best mode contemplated by the inventor for carrying out her invention in a commercial environment, although it should be understood that various modifications can be accomplished within the parameters of the present invention.

Referring now to the drawings for a detailed description of the present invention, reference is first made to FIGS. 1, 2, 3, 4 and 5, depicting generally rectangular base 10, having integrally formed longer front panel 11, longer rear panel 12, shorter side panels 13, and bottom panel 14. A plurality of base ventilation holes 15 are disposed through front panel 11, rear panel 12 and side panels 13, and two vertical pin cylinders 16 are attached to the interior of base 10 so that one pin cylinder 16 is located at the each of the corners formed by side panels 13 and rear panel 12. The height of pin cylinders 16 is greater than the interior depth of base 10, so that pin cylinders 16 extend vertically above the upper edge of base 10. As more clearly depicted in FIGS. 3, 4 and 5, a plurality of integrally formed generally rectangular tray side support plates 17 are disposed inside base 10 so that each tray side support plate 17 is located adjacent to bottom panel 14 and a side panel 13. The height of side support plates 17 is uniform, and is less than the interior depth of base 10, so that base 10 extends vertically above side support plates 17. In addition, a pair of generally triangular pin bushing support plates 18 are attached to each pin cylinder 16 and bottom panel 14 so that each pair of pin bushing support plates 18 form an angle of approximately 90 degrees.

Figure 4:
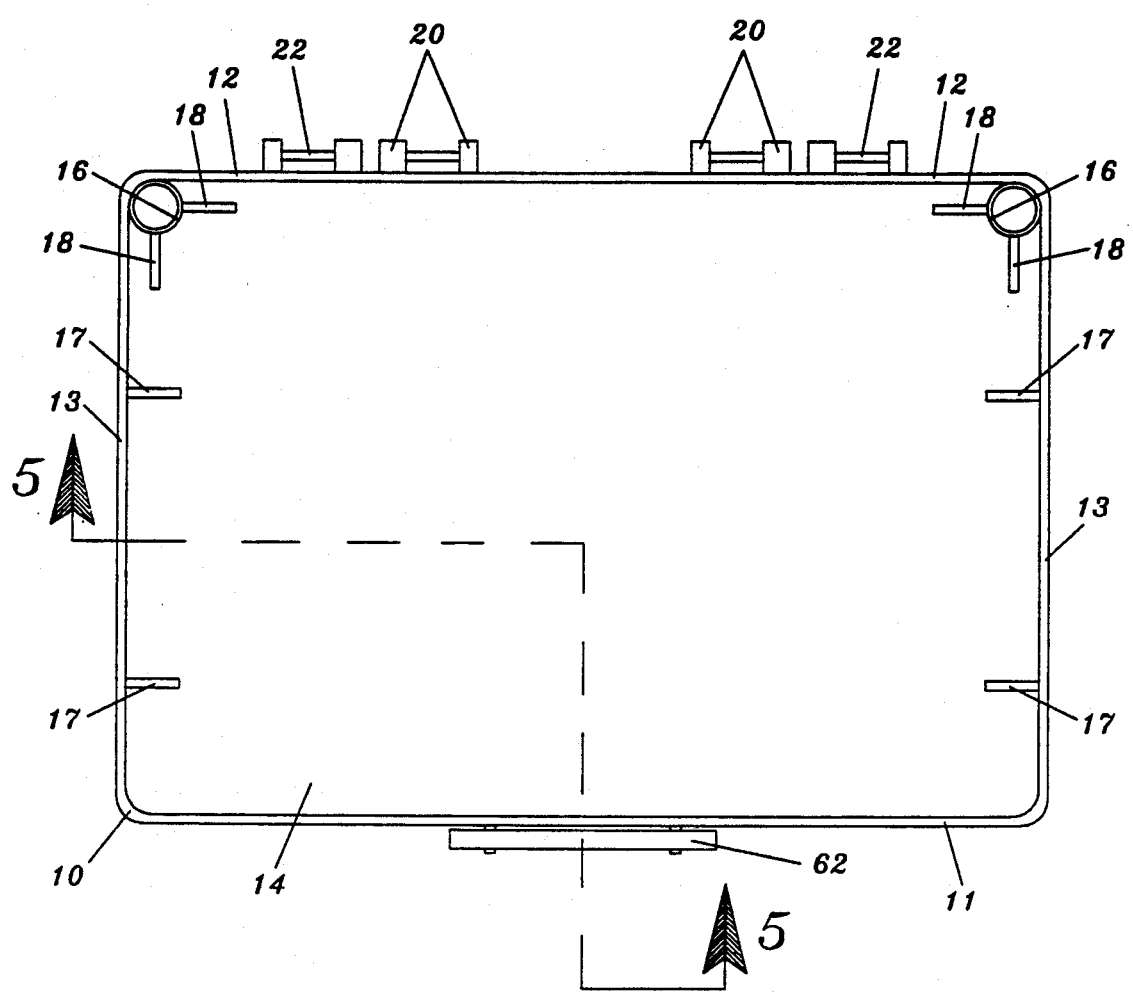
FIG. 4 is a top plan view of the base of a cake decorating utensil container representing the present invention.
Figure 6:
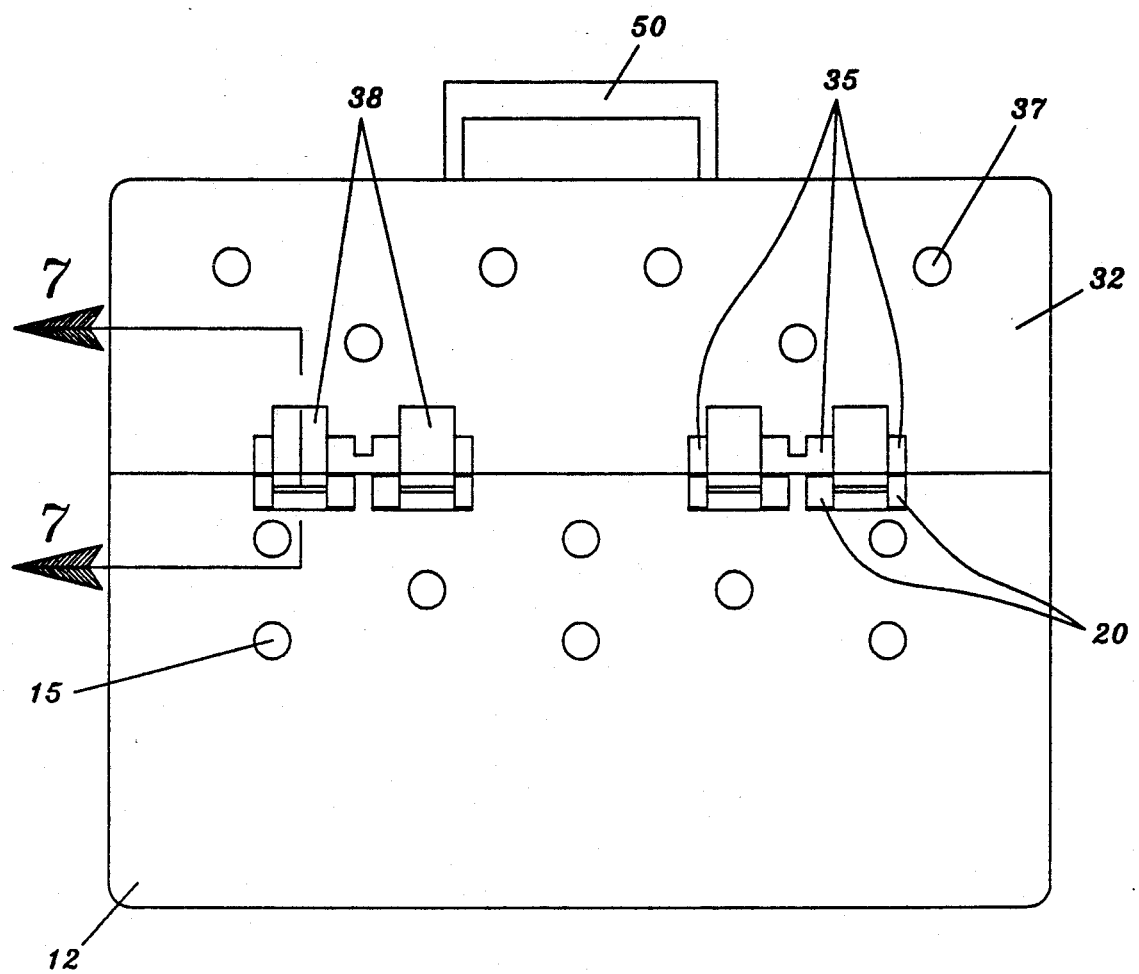
FIG. 6 is a rear view of a cake decorating utensil container representing the present invention.
Figure 7:
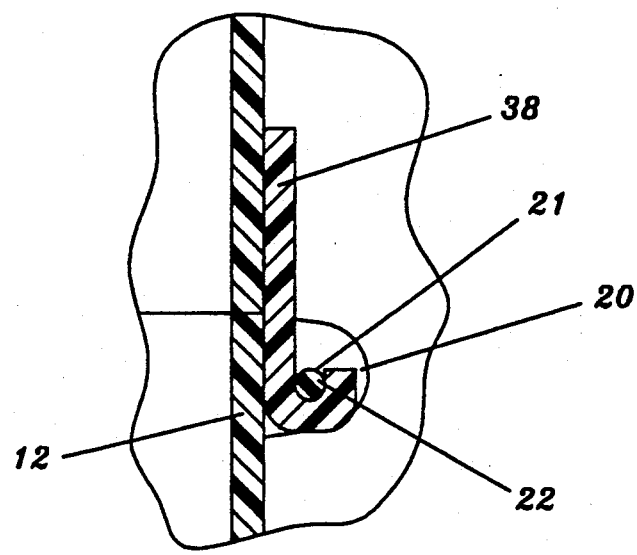
FIG. 7 is a partial section view taken along line 7—7 of FIG. 6.
Figure 12:
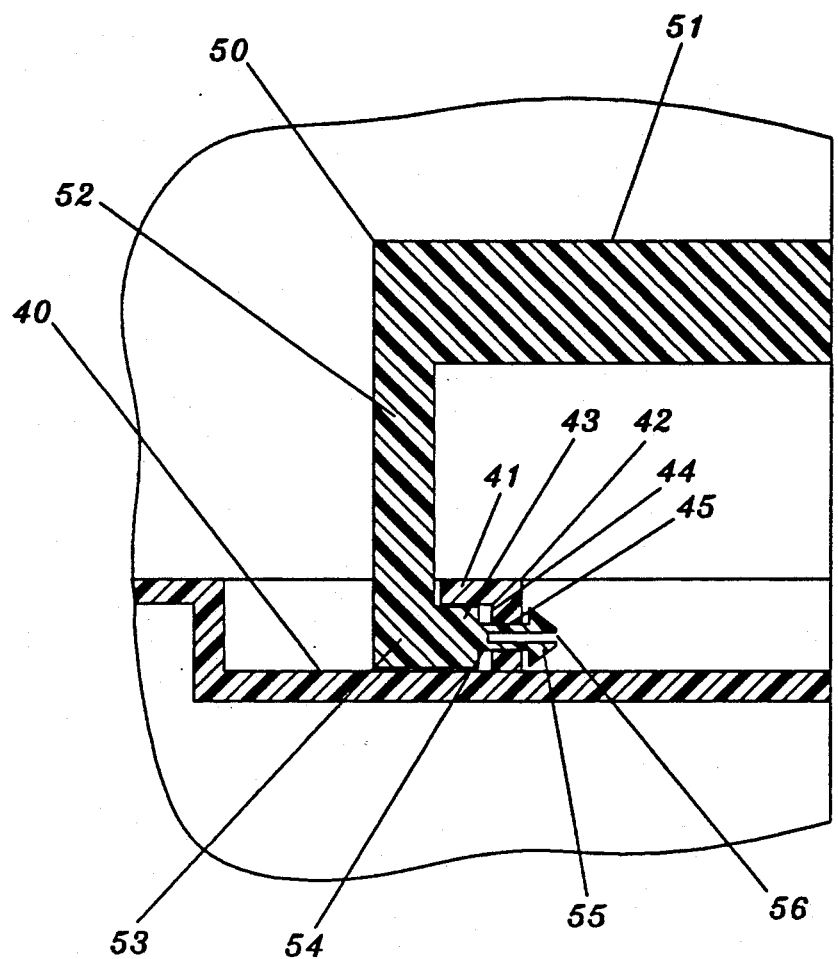
FIG. 12 is a detail view of the handle portion of a cake decorating utensil container representing the present invention.
Figure 8:
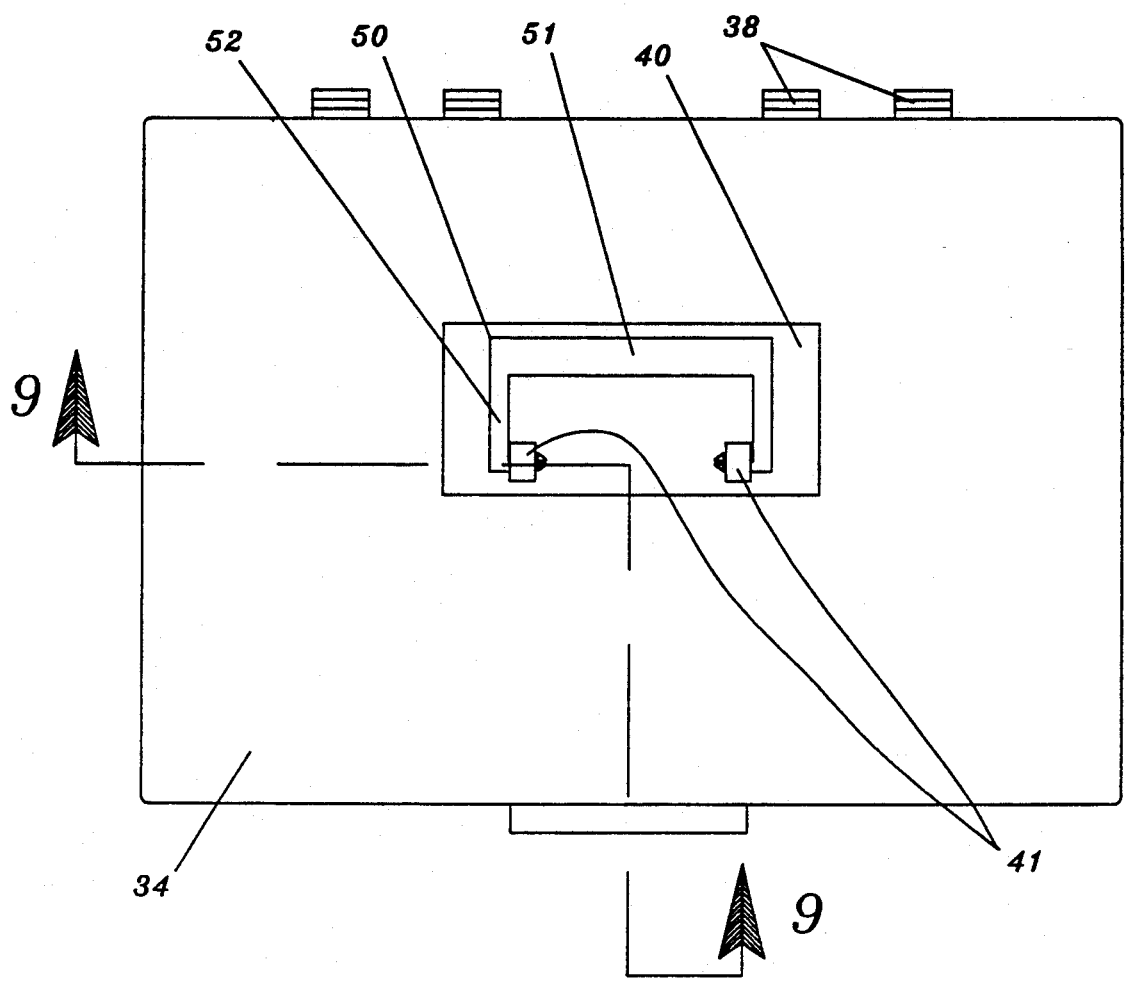
FIG. 8 is a top plan view of the cover of a cake decorating utensil container representing the present invention.
Figure 9:
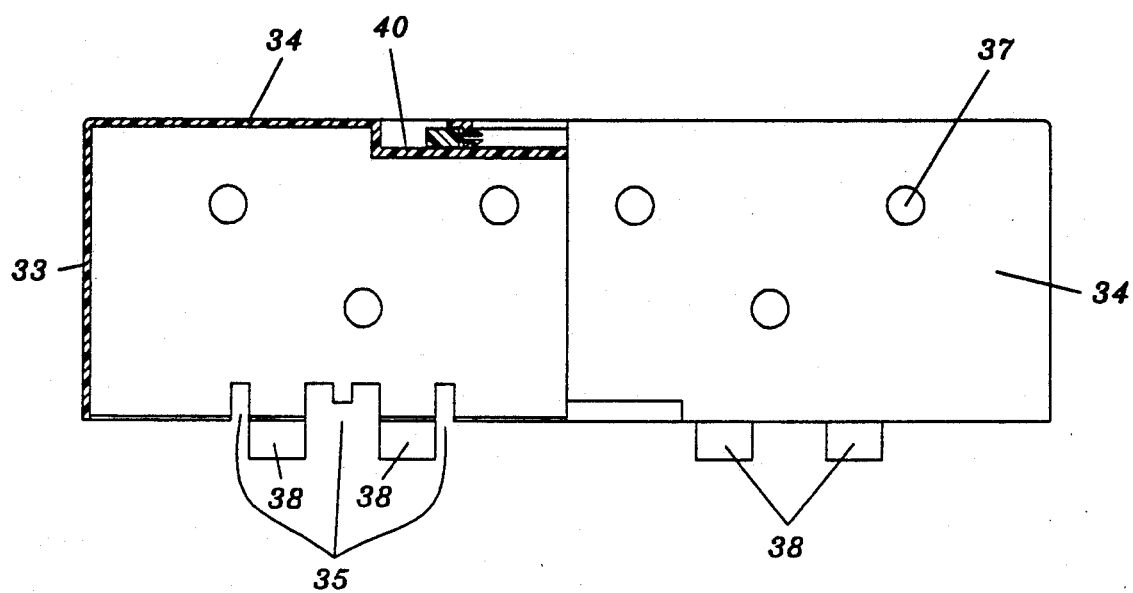
FIG. 9 is a partial section view taken along line 9—9 of FIG. 8.

As depicted in FIGS. 4, 6, and 7, a plurality of hinge tabs 20, each having a hinge tab hole 21, are attached in pairs exterior to and along rear panel 12 so that the axes of all hinge tab holes 21 are collinear and the distance between the members of each pair of hinge tabs 20 is uniform. Attached between each pair of hinge tabs 20 and diposed through hinge tab holes 21 is a hinge rod 22.

Referring now to FIGS. 1, 2, 3, 6, 8 and 9, generally rectangular cover 30 has integrally formed longer cover front panel 31, longer cover rear panel 32, shorter cover side panels 33, and cover top panel 34. The dimensions of cover 30 are chosen to be the same as bottom panel 14, so that cover 30 is capable of fitting to and aligning with base 10. Hinge tab clearance notches 35 are disposed along the lower edge of cover rear panel 32. A plurality of cover ventilation holes 37 are disposed through cover front panel 31, cover rear panel 32 and cover side panels 33.

As shown in FIGS. 6, 7, 8, and 9, a plurality of generally J-shaped hinge hooks 38 are attached to the exterior of cover rear panel 32, disposed with the lower portion of each hinge hook 38 extending below the lower edge of cover rear panel 32, so that the axes of all hinge hooks 38 are collinear and one hinge hook may slidably fit between the members of each pair of hinge tabs 20 and around a hinge rod 22.

FIGS. 3, 8, 9 and 12 depict integrally formed, recessed, generally rectangular handle panel 40. Attached to handle panel 40 and projecting towards the exterior of cover top panel 34 are two handle hinge tabs 41, each handle hinge tab 41 defining a generally cylindrical stepped bore 42 having a larger bore portion 43, a step 44 and a smaller bore portion 45, disposed near a longer side of handle panel 40 so that axes of stepped bores 42 are collinear. Generally U-shaped handle 50 has generally rectangular cross-section handle longer side 51, disposed with one of handle shorter sides 52 attached at each end of handle longer side 51 so that handle longer side 51 and handle shorter sides 52 are coplanar and handle longer side 51 forms a right angle with respect to each handle shorter side 52. Disposed at the end of each handle shorter side 52 not attached to handle longer side 51 is a handle arc rod 53 having an inwardly projecting handle neck 54 and generally conical handle tab 55, disposed so that the axes of handle rods 53, handle necks 54 and handle tabs 55 are collinear. The diameter of each handle arm rod 53 is chosen to be slightly less than the diameter of each larger bore portion 43, and the diameter of each handle neck 54 is chosen to be slightly less than the diameter of each smaller bore portion 45. Disposed at the smaller end of each handle tab 55 is a handle tab slot 56. The length of handle longer side 51 and the width of handle shorter sides 52 are chosen so that the distance between the proximate sides of handle shorter sides 52 is slightly greater than the distal sides of handle hinge tabs 41. Similarly, the axial length of each handle arm rod 53 is chosen so that the distance between proximate ends of handle arm rods 53 is slightly greater than the distance between steps 44. The length of each handle shorter side 52 is chosen to be less than the length of the lesser side of handle panel 40, and the length of each handle neck 54 is chosen to be slightly greater than the axial length each of smaller bore 45. The dimensions of each handle tab 55 and handle tab slot 56 are chosen so that each handle tab 55 may be compressed, partially eliminating a handle tab slot 56. In this way, each handle tab 55 may be pushed through a smaller bore 45, with each handle tab 55 expanding to original size after moving entirely through a smaller bore 45. By these selections of dimensions, handle 50 may be removably and rotatably attached to handle hinge tabs 41 so that handle 50 may be used to lift the present invention, yet is capable of rotating with respect to cover 30 in order to lie essentially flat within the recessed handle panel 40.

Figure 5:
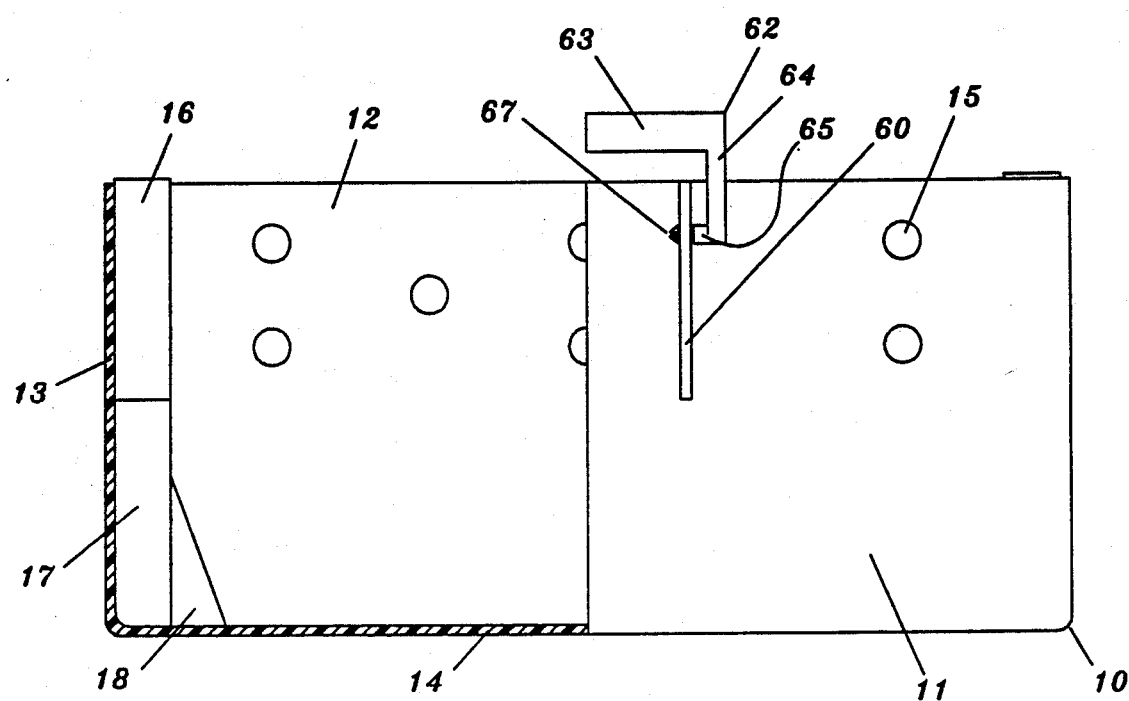
FIG. 5 is a partial section view taken along line 5—5 of FIG. 4.
Figure 10:
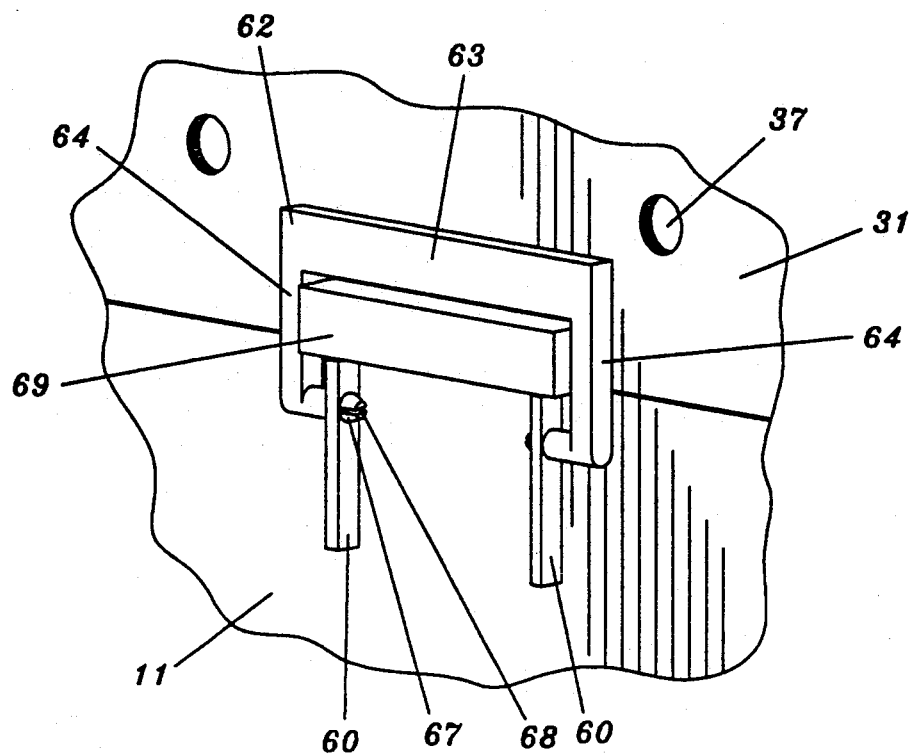
FIG. 10 is a detail view of the latch portion in the closed position of a cake decorating utensil container representing the present invention.
Figure 11:
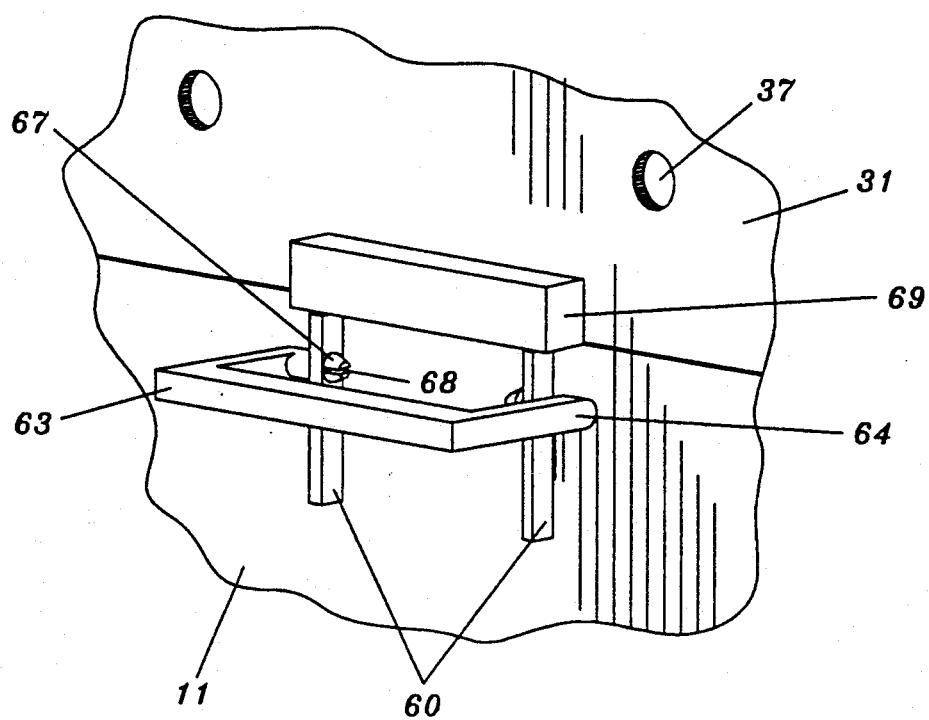
FIG. 11 is a detail view of the latch portion in the opened position of a cake decorating utensil container representing the present invention.

As shown in FIGS. 5, 10 and 11, disposed along and attached exterior to front panel 11 are generally rectangular latch side members 60 having collinear latch holes, not shown. Generally U-shaped latch arm 62 is similar to handle 50, and has generally rectangular cross-section latch arm longer side 63, disposed with one of latch arm shorter sides 64 attached at each end of latch arm longer side 63 so that latch arm longer side 63 and latch arm shorter sides 64 are coplanar and latch arm longer side 63 forms a right angle with respect to each latch arm shorter side 64. Disposed at the end of each latch arm shorter side 64 not attached to latch arm longer side 63 is a latch arm rod 65 having an inwardly projecting latch neck, not shown, and generally conical latch tab 67, disposed so that the axes of latch arm rods 65, latch necks and latch tabs 67 are collinear. Disposed at the smaller end of each latch tab 67 is a latch tab slot 68. The length of latch arm longer side 63, the width of latch arm shorter sides 64, and the axial length of latch arm rods 65 are chosen so that the distance between the proximate ends of latch arm rods 65 is slightly greater than the distance between the distal sides of latch side members 60. In addition, the diameter of each latch neck is chosen to be slightly less than the diameter of each latch hole, and the length of each latch neck is chosen to be slightly greater than the width of each latch side member 60. Also, the dimensions of each latch tab 67 and latch tab slot 68 are chosen so that each latch tab 67 may be compressed, partially eliminating a latch tab slot 68. In this way, each latch tab 67 may be pushed through a latch hole, with each latch tab 67 expanding to original size after moving entirely through a latch hole. It is seen that by the above noted selections of dimensions, latch arm 62 may be rotatably and removably attached to latch side members 60. Generally rectangular latch plate 69 is located exterior to cover 30 and attached to cover front panel 31. The dimensions of latch plate 69 are chosen so that latch arm 62 may be upwardly rotated from the position shown in FIG. 11, that is, from an open position, to the position shown in FIG. 10, that is, a closed position where latch arm 62 is disposed to fit over latch plate 69, removably securing cover 30 to base 10.

Figure 2:
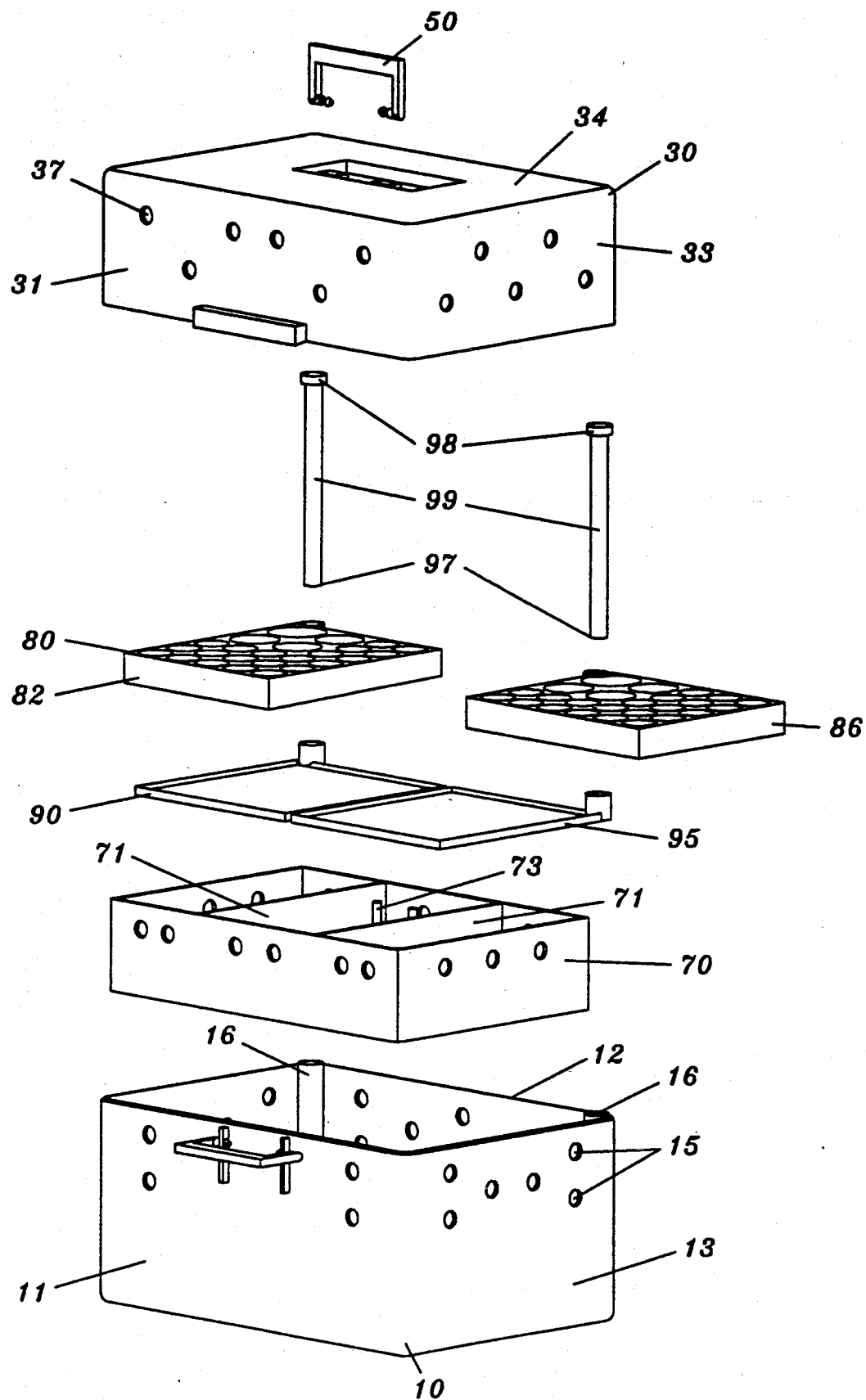
FIG. 2 is an exploded front perspective view of cake decorating utensil container representing the present invention.
Figure 3:
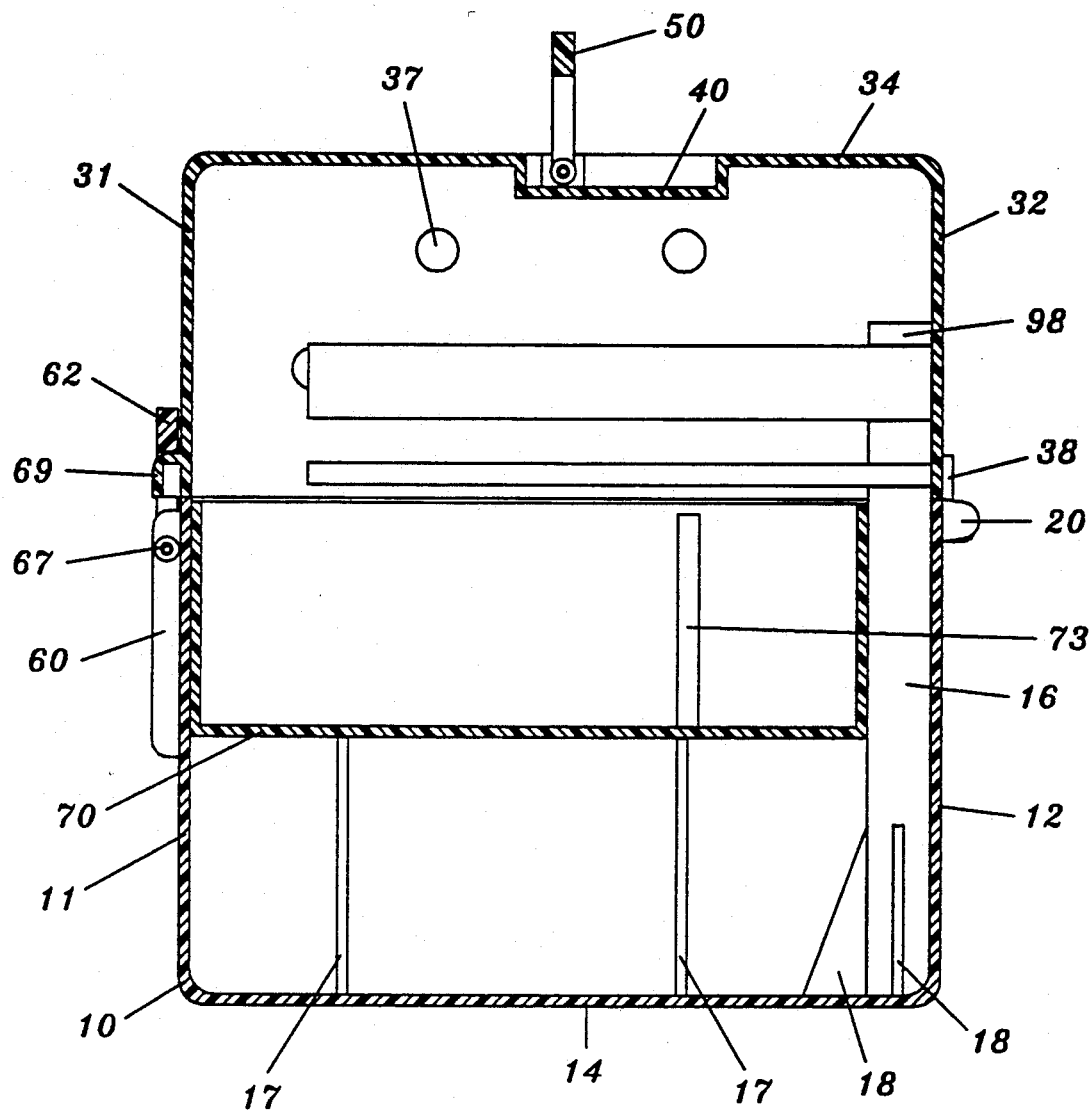
FIG. 3 is a section view taken along line 3—3 of FIG. 1.
Figure 13:
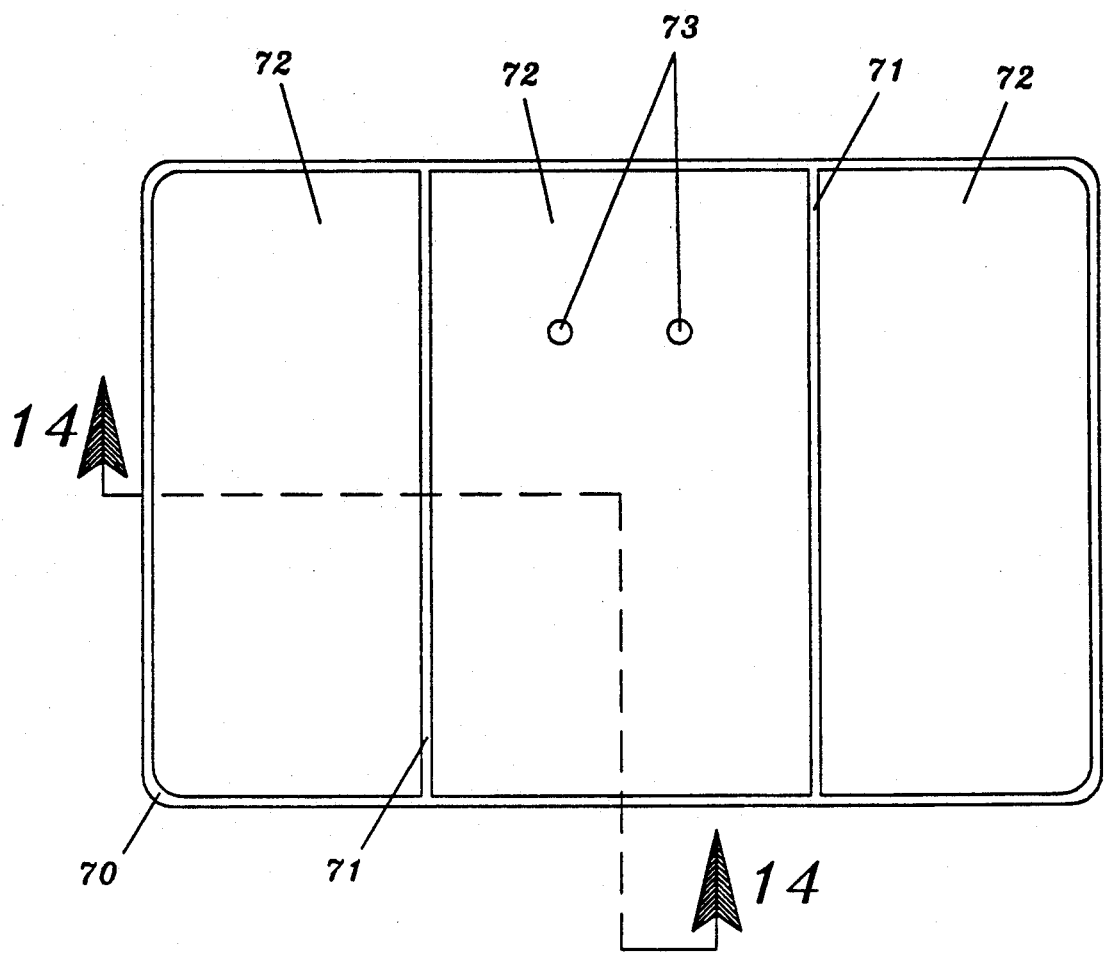
FIG. 13 is a top plan view of the tray of a cake decorating utensil container representing the present invention.
Figure 14:
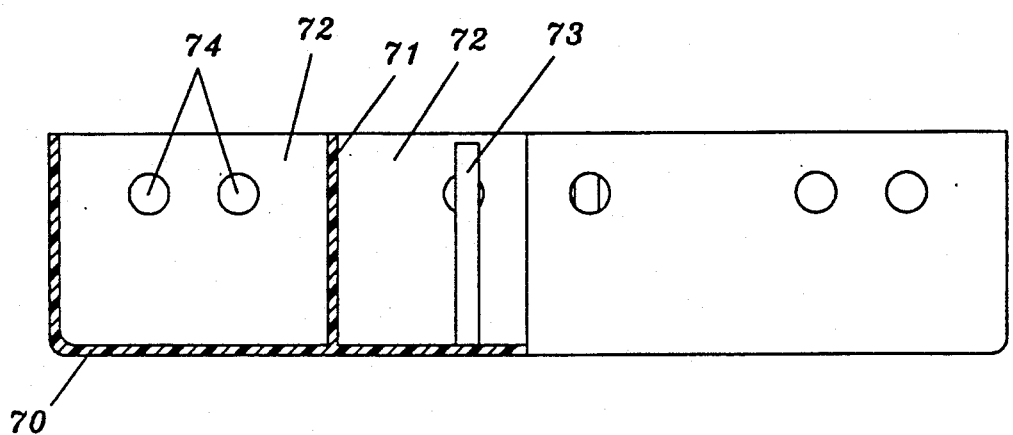
FIG. 14 is a partial section view taken along line 14—14 of FIG. 13.

FIGS. 2, 13, and 14 depict generally rectangular utensil tray 70 having integrally formed tray dividers 71 defining compartments 72, and integrally formed pillars 73 disposed normal to the bottom of utensil tray 70. Pillars 73 may be used to conveniently store cake decorating coupler rings. A plurality of tray ventilation holes 74 are disposed through the sides of utensil tray 70. The exterior dimension of the longer side of utensil tray 70 is chosen to be slightly less than the corresponding interior dimension of base 10, and the exterior dimension of the shorter side of utensil tray 70 is chosen to be slightly less than the perpendicular distance between the interior of front panel 11 and the exterior of pin cylinders 16, as shown in FIG. 3. In this way, utensil tray 70 is capable of being removably placed within base 10 while being supported on side support plates 17, providing ventilation to items stored in the portion of base 10 below utensil tray 70.

Figure 15:
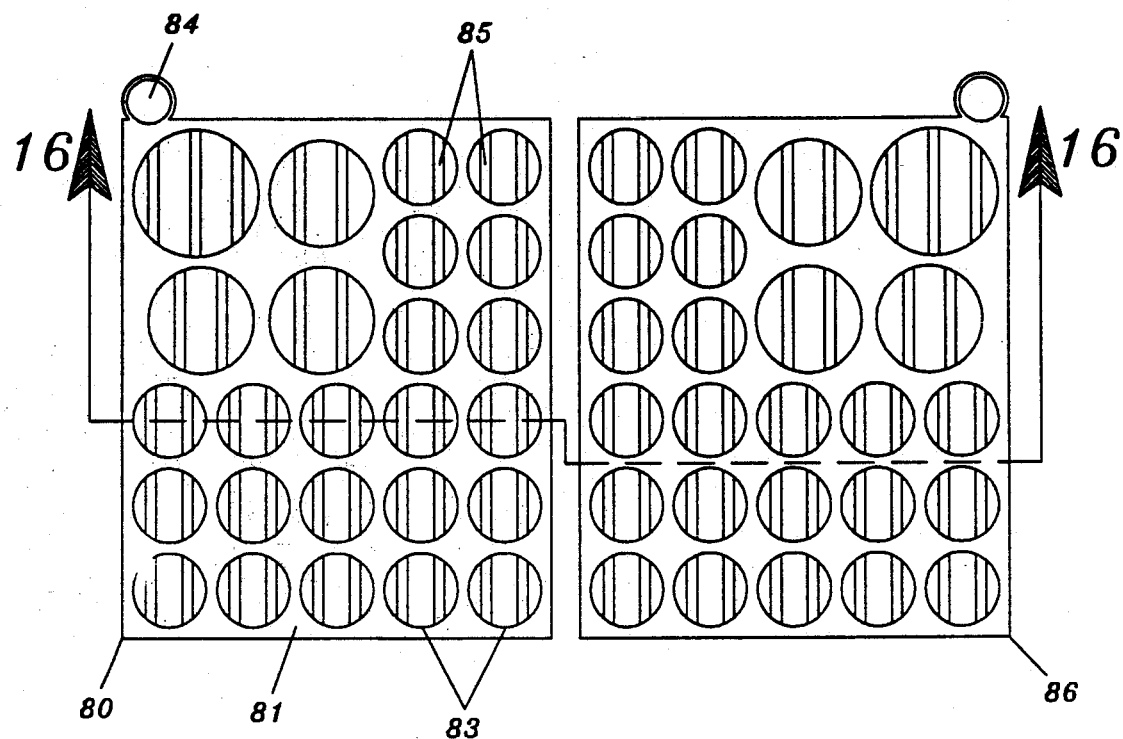
FIG. 15 is a top plan view of the pastry tip holders of a cake decorating utensil container representing the present invention.
Figure 16:
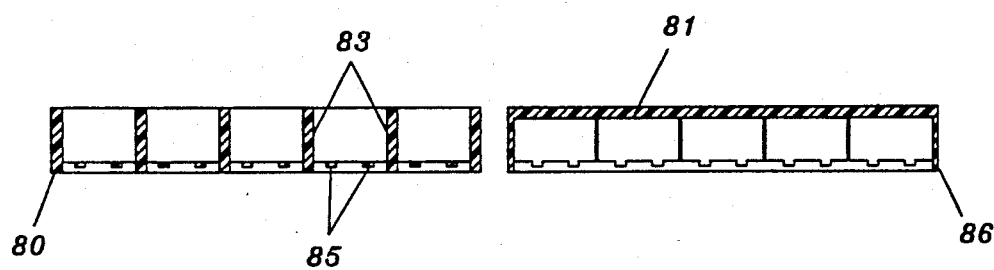
FIG. 16 is a section view taken along line 16—16 of FIG. 15.

Referring to FIGS. 2, 15, and 16, generally rectangular left pastry tip holder 80 is depicted, having holder plate 81 integrally formed with surrounding, perimeter wall 82 and a plurality of generally cylindrical pastry tip sleeves 83 extending normal to and below holder plate 81. Integral holder pin bushing 84, having interior diameter substantially the same as the interior diameter of each pin cylinder 16, is disposed at the rear exterior corner of left pastry tip holder 80 so that the axis of holder pin bushing 84 is normal to the plane defined by holder plate 81. Pastry tip sleeves 83 are generally arranged in rows and columns as far as possible depending on the distribution of diameters of pastry tip sleeves 83. Attached to the bottom of pastry tip sleeves 83 and disposed parallel to the plane defined by holder plate 81 are a plurality of parallel support strips 85 disposed so that at least two support strips 85 cross each pastry tip sleeve 83 while openings are maintained between adjacent support strips 85, in order to facilitate the drainage of moisture as hereinafter described. Also as shown in FIGS. 2, 15, and 16, generally rectangular right pastry tip holder 86 is a mirror image of left pastry tip holder 80. The dimensions of left and right pastry tip holders 80 and 86 are chosen so that when left and right pastry tip holders 80 and 86 are placed side by side as shown in FIGS. 2, 15, and 16, left and right pastry tip holders 80 and 86 are capable of fitting within cover 30.

Figure 17:
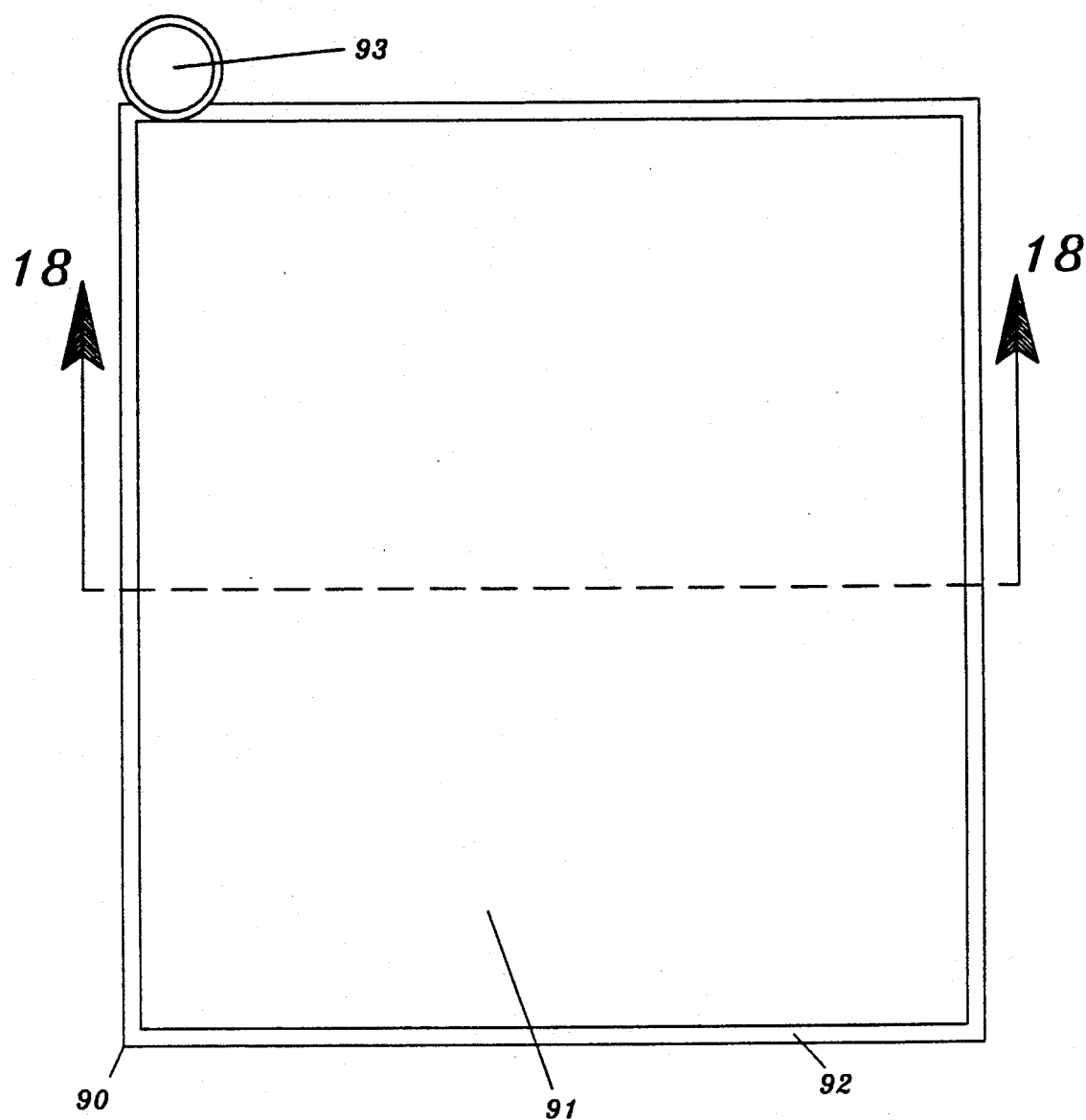
FIG. 17 is a top plan view of a drip plate of a cake decorating utensil container representing the present invention.
Figure 18:
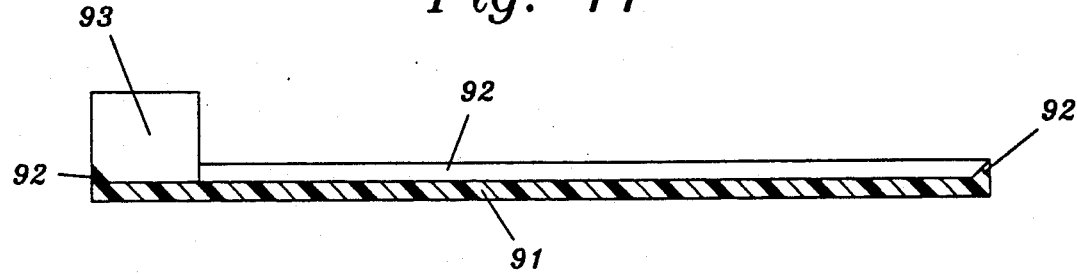
FIG. 18 is a partial section view taken along line 18—18 of FIG. 17.

Depicted in FIGS. 2, 17 and 18 is generally rectangular left drip tray 90, having drip plate 91 integrally formed with surrounding, perimeter rib 92 extending above drip plate 91. Drip tray pin bushing 93, having interior diameter substantially the same as the interior diameter of pin cylinders 16, is attached at the rear exterior corner of left drip tray 90 so that the axis of drip tray pin bushing 93 is normal to the plane defined by left drip tray 90. The height of drip tray pin bushing 93 above the plane of left drip plate 91 is chosen to provide air space between left drip plate 91 and left pastry tip holder 80, as shown in FIGS. 2 and 3. Also, as depicted in FIG. 2, generally rectangular right drip tray 95 is a mirror image of left drip tray 90. The dimensions of left and right drip trays 90 and 95 are chosen to be substantially the same as the dimensions of left and right pastry tip holders 80 and 86, so that left and right drip trays 90 and 95 may act to catch moisture falling from left and right pastry tip holders 80 and 86, as hereinafter described.

Figure 19:
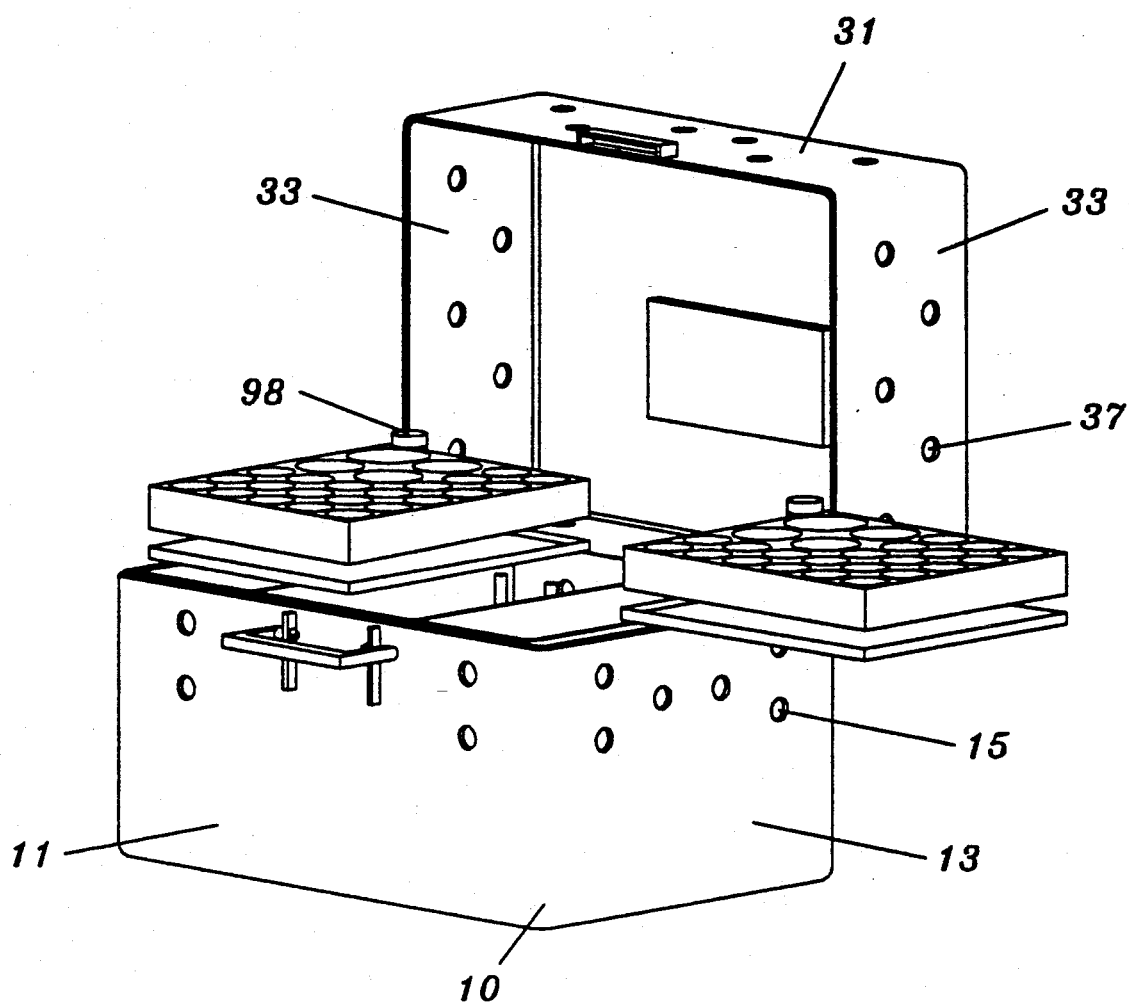
FIG. 19 is a front perspective view in a partially opened configuration of a cake decorating utensil container representing the present invention.

As shown in FIGS. 2, 3 and 19, each of pins 97, having pin head 98 and pin shaft 99, may be removably slid through a holder pin bushing 84, a drip tray pin bushing 93, and into a pin cylinder 16. The exterior diameter of each pin shaft 99 is chosen to be slightly less than the interior diameter of one of holder pin bushings 84, which is substantially the same as the interior diameter of each drip tray pin bushing 93 and pin cylinder 16 as noted previously. The length of pin shaft 99 is chosen to be slightly less than the sum of the axial dimensions of a holder pin bushing 84, a drip tray pin bushing 93 and a pin cylinder 16.

In use, a pastry tip that has been cleaned but not dried may be placed, for example, in a pastry tip sleeve 83 of left pastry tip holder 80, supported on support strips 85. Maintaining left drip tray 90 below left pastry tip holder 80, the water remaining on the pastry tip may fall downward, through the openings between support strips 85, and onto left drip tray 90. Water collected on left drip tray 90 is collected by virtue of the surrounding, perimeter rib 92, and, in addition, may be absorbed by a paper towel or similar disposable absorbent material placed on drip plate 91. As previously noted, the height of drip tray pin bushing 93 above left drip tray 91 is chosen to provide air space between left drip plate 91 and left pastry tip holder 80. In this way, moisture present on left drip tray 91 does not physically contact left pastry tip holder 80, thereby aiding in the rapid and sanitary drying of pastry tips. Moreover, placement of pastry tips in pastry sleeves 83 as described allows pastry tips to be stored in an erect position, allowing easy identification of individual pastry tips, thereby preventing pastry tips from falling over and becoming unrecognizable as to their decoration potential. Base ventilation holes 15, cover ventilation holes 37 and tray ventilation holes 74 permit air to circulate throughout the interior of the present invention, aiding evaporation.

In the event that it is necessary to gain access to utensil tray 70 either to remove an item from utensil tray 70, or to remove utensil tray 70 from base 10 in order to gain access to the portion of base 10 below utensil tray 70, left and right pastry tip holders 80 and 86, and left and right drip trays 90 and 95 may be rotated outwardly about pins 97, as shown, for example, in FIG. 19 for the case of outward rotation of right pastry tip holder 86 and right drip tray 95, without disturbing pastry tips present in left and right pastry tip holders 80 and 86.

Disassembly of the present invention for cleaning, for instance in an automatic dishwasher, may be accomplished by removing pins 97 from pin cylinders 16, thereby permitting removal of left and right pastry tip holders 80 and 86, and left and right drip trays 90 and 95. Utensil tray 70 may be lifted out of base 10, and cover 30 may be separated from base 10 by opening and rotating cover 30 approximately 180 degrees with respect to base 10 so that hinge hooks 38 may be disengaged from hinge rods 22. In addition, latch arm 62 may be removed from latch side members 62 and handle 50 may be removed from handle hinge tabs 41 as previously described.

The components of the present invention may be formed from resilient, non-ferrous, easily cleaned materials such as plastics, thereby achieving the required structural integrity and providing resistance to corrosion while being suitable for cleaning by hand or in an automatic dishwasher, yet are flexible enough to permit repeated disassembly and assembly of latch are 62 and handle 50.

The present invention having been described in its preferred embodiment, it is clear that it is susceptible to numerous modifications and embodiments within the ability of those skilled in the art and without the exercise of the inventive faculty. Accordingly, the scope of the present invention is defined by the scope of the following claims.

What is claimed is:

1. Cake decorating utensil organizing container, comprising:
   a base having a generally planar bottom panel and a surrounding base wall, said base wall having uniform height and disposed generally normal to and above said bottom panel;
   a cover having a generally planar top panel and a surrounding cover wall, said cover wall having uniform height and disposed generally normal to and below said top panel, and said top panel having substantially the same planar dimensions as said bottom panel;
   means for removably attaching said cover to said base so that the upper edge of said base wall is capable of alignment with the lower edge of said cover wall;
   a holder, having a generally planar holder plate, a plurality of sleeves extending normal to and below said holder plate, and a plurality of support strips, said holder plate having planar dimensions less than the planar dimensions of said top panel, and said support strips attached across the lower edges of said sleeves so that at least two support strips are disposed to cross the lower edge of each of said sleeves and so that adjacent support strips are not in physical contact;
   a drip tray, having a generally planar drip plate and a continuous rib disposed to surround and extend above said drip plate, said drip plate having planar dimensions substantially the same as the planar dimensions of said holder plate; and mounting means, for removably attaching said holder and said drip tray to said base so that the planes of said holder plate and said drip plate are generally horizontal, said drip tray is disposed above the upper edge of said base wall and below and separated from said holder, and said holder and said drip tray may be rotated outwardly with respect to said base about a generally vertical axis.

2. Cake decorating utensil organizing container as defined in claim 1, wherein said base wall has a plurality of base ventilation holes and said cover wall has a plurality cover ventilation holes.

3. Cake decorating utensil organizing container as defined in claim 2, further comprising:
   a utensil tray having a vertically disposed pillar and a plurality of ventilation holes, with the exterior dimensions of said utensil tray less than the interior dimensions of said base; and
   means for supporting said utensil tray within said base so that said utensil tray is not in physical contact with said bottom panel.

4. Cake decorating utensil organizing container as defined in claim 3, wherein said bottom panel and said top panel are generally rectangular.

5. Cake decorating utensil organizing container as defined in claim 4, wherein said means for removably attaching said cover to said base comprises:
   a demountable hinge rod portion disposed adjacent to the exterior of said base wall;
   a demountable hinge hook portion, disposed adjacent to the exterior of the proximate portion of said cover wall;
   a latch lower portion disposed adjacent to the exterior of said base wall and opposed to said hinge rod portion; and
   a latch upper portion disposed adjacent to the exterior of said cover wall and opposed to said hinge hook portion.

6. Cake decorating utensil organizing container as defined in claim 5, further comprising a handle attached to the exterior of said top panel.

7. Cake decorating utensil organizing container, comprising:
   a base having a generally planar bottom panel, a surrounding base wall, and a pin cylinder, said base wall having uniform height and disposed generally normal to and above said bottom panel, and said pin cylinder attached to the interior of said base, so that said pin cylinder extends above the upper edge of said base wall;
   a cover having a generally planar top panel and a surrounding cover wall, said cover wall having uniform height and disposed generally normal to and below said top panel, and said top panel having substantially the same planar dimensions as said bottom panel;
   means for removably attaching said cover to said base so that the upper edge of said base wall is capable of alignment with the lower edge of said cover wall;
   a holder, having a generally planar holder plate, a holder pin bushing, a plurality of sleeves extending normal to and below said holder plate, and a plurality of support strips, said holder plate having planar dimensions less than the planar dimensions of said top panel, said holder pin bushing having interior diameter substantially the same as the interior diameter of said pin cylinder and attached along the perimeter of and normal to the plane of said holder plate, and said support strips attached across the bottom edges of said sleeves so that at least two support strips are disposed to cross the bottom edge of each of said sleeves and so that adjacent support strips are not in physical contact;

a drip tray, having a generally planar drip plate, a continuous rib disposed to surround and extend above said drip plate, and a drip tray pin bushing, said drip plate having planar dimensions substantially the same as the planar dimensions of said holder plate, and said drip tray pin bushing having interior diameter substantially the same as the interior diameter of said pin cylinder, and having axial height greater than the height of said continuous rib, attached proximate to said continuous rib so that the axis of said drip tray pin bushing is normal to the plane of said drip plate, so that the lower edge of said drip tray pin bushing aligns with the lower surface of said drip plate, and so that the axis of said drip tray pin bushing is collinear with the axis of said holder pin bushing when said drip plate is aligned below said holder plate in a parallel plane; and a pin, having a pin head and a pin shaft, said pin shaft having exterior diameter slightly less than the interior diameter of said holder pin bushing and having length slightly less than the sum of the axial dimensions of said holder pin bushing, said drip tray pin bushing and said pin cylinder, said pin removably slidable through said holder pin bushing and said drip tray pin bushing and into said pin cylinder so that said pin head contacts the upper surface of said holder pin bushing.

8. Cake decorating utensil organizing container as defined in claim 7, wherein said base wall has a plurality of base ventilation holes and said cover wall has a plurality cover ventilation holes.

9. Cake decorating utensil organizing container as defined in claim 8, further comprising:

a utensil tray having a vertically disposed pillar and a plurality of ventilation holes, with the exterior dimensions of said utensil tray less than the interior dimensions of said base; and means for supporting said utensil tray within said base so that said utensil tray is not in physical contact with said bottom panel.

10. Cake decorating utensil organizing container as defined in claim 9, wherein said bottom panel and said top panel are generally rectangular.

11. Cake decorating utensil organizing container as defined in claim 10, wherein said means for removably attaching said cover to said base comprises:

a demountable hinge rod portion disposed adjacent to the exterior of said base wall;

a demountable hinge hook portion, disposed adjacent to the exterior of the proximate portion of said cover wall;

a latch lower portion disposed adjacent to the exterior of said base wall and opposed to said hinge rod portion; and a latch upper portion disposed adjacent to the exterior of said cover wall and opposed to said hinge hook portion.

12. Cake decorating utensil organizing container as defined in claim 11, further comprising a handle attached to the exterior of said top panel.

13. Cake decorating utensil organizing container, comprising:

a base having a generally planar bottom panel, a surrounding base wall, and two pin cylinders, said base wall having uniform height and disposed generally normal to and above said bottom panel, and said pin cylinders attached to the interior of said base, so that each of said pin cylinder extends above the upper edge of said base wall;

a cover having a generally planar top panel and a surrounding cover wall, said cover wall having uniform height and disposed generally normal to and below said top panel, and said top panel having substantially the same planar dimensions as said bottom panel;

means for removably attaching said cover to said base so that the upper edge of said base wall is capable of alignment with the lower edge of said cover wall;

a pair of holders, each of said holders having a generally planar holder plate, a holder pin bushing, a plurality of sleeves extending normal to and below each of said holder plates, and a plurality of support strips, said holder plates having combined planar dimensions less than the planar dimensions of said top panel, each of said holder pin bushings having interior diameter substantially the same as the interior diameter of said pin cylinders and attached along the perimeter of and normal to the plane of one of said holder plates, and said support strips attached across the bottom edges of said sleeves so that at least two support strips are disposed to cross the bottom edge of each of said sleeves and so that adjacent support strips are not in physical contact;

a pair of drip trays, each of said drip trays having a generally planar drip plate, a continuous rib disposed to surround and extend above each of said drip plates, and a drip tray pin bushing, each of said drip plates having planar dimensions substantially the same as the planar dimensions of one of said holder plates, and each of said drip tray pin bushings having interior diameter substantially the same as the interior diameter of one of said pin cylinders, having axial height greater than the height of one of said continuous ribs, and attached proximate to one of said continuous ribs so that the axis of each of said drip tray pin bushings is normal to the plane of one of said drip plates, so that the lower edge of each of said drip tray pin bushings aligns with the lower surface of one of said drip plates, and so that the axis of each of said drip tray pin bushings is collinear with the axis of one of said holder pin bushings when each of said drip plates is aligned below one of said holder plates in a parallel plane; and a pair of pins, each of said pins having a pin head and a pin shaft, each of said pin shafts having exterior diameter slightly less than the interior diameter of one of said holder pin bushing and having length slightly less than the sum of the axial dimensions of one of said holder pin bushings, one of said drip tray pin bushings and one of said pin cylinders, each of said pins removably slidable through one of said holder pin bushings and one of said drip tray pin bushings and into one of said pin cylinders so that each of said pin heads contacts the upper surface of one of said holder pin bushings.

14. Cake decorating utensil organizing container as defined in claim 13, wherein said base wall has a plurality of base ventilation holes and said cover wall has a plurality cover ventilation holes.

15. Cake decorating utensil organizing container as defined in claim 14, further comprising:
   a utensil tray having a vertically disposed pillar and a plurality of ventilation holes, with the exterior dimensions of said utensil tray less than the interior dimensions of said base; and
   means for supporting said utensil tray within said base so that said utensil tray is not in physical contact with said bottom panel.

16. Cake decorating utensil organizing container as defined in claim 15, wherein said bottom panel and said top panel are generally rectangular, each of said pin cylinders is disposed adjacent corners of said bottom panel, and each of said holders plates is generally rectangular.

17. Cake decorating utensil organizing container as defined in claim 16, wherein said means for removably attaching said cover to said base comprises:
   a demountable hinge rod portion disposed adjacent to the exterior of said base wall;
   a demountable hinge hook portion, disposed adjacent to the exterior of the proximate portion of said cover wall;
   a latch lower portion disposed adjacent to the exterior of said base wall and opposed to said hinge rod portion; and
   a latch upper portion disposed adjacent to the exterior of said cover wall and opposed to said hinge hook portion.

18. Cake decorating utensil organizing container as defined in claim 17, further comprising a handle attached to the exterior of said top panel.

* * * * *